(12) United States Patent
Scholle

(10) Patent No.: US 11,268,610 B2
(45) Date of Patent: Mar. 8, 2022

(54) DRIVE DEVICE AND MOTOR VEHICLE HAVING A DRIVE DEVICE

(71) Applicant: AUDI AG, Ingolstadt (DE)

(72) Inventor: Tassilo Scholle, Ingolstadt (DE)

(73) Assignee: AUDI AG, Ingolstadt (DE)

(*) Notice: Subject to any disclaimer, the term of this patent is extended or adjusted under 35 U.S.C. 154(b) by 317 days.

(21) Appl. No.: 16/488,694

(22) PCT Filed: Jan. 15, 2018

(86) PCT No.: PCT/EP2018/050846
§ 371 (c)(1),
(2) Date: Aug. 26, 2019

(87) PCT Pub. No.: WO2018/157985
PCT Pub. Date: Sep. 7, 2018

(65) Prior Publication Data
US 2021/0207703 A1 Jul. 8, 2021

(30) Foreign Application Priority Data

Mar. 3, 2017 (DE) .................. 10 2017 203 541.2

(51) Int. Cl.
*F16H 57/04* (2010.01)
*B60K 6/405* (2007.10)

(52) U.S. Cl.
CPC ....... *F16H 57/045* (2013.01); *F16H 57/0473* (2013.01); *B60K 6/405* (2013.01); *F16H 57/0476* (2013.01)

(58) Field of Classification Search
None
See application file for complete search history.

(56) References Cited

U.S. PATENT DOCUMENTS

| 2,796,239 | A | 6/1957 | Ralph et al. | |
| 5,433,282 | A | 7/1995 | Moroto et al. | |
| 9,840,143 | B1* | 12/2017 | Keller | F04B 23/12 |
| 2006/0060170 | A1* | 3/2006 | Ozawa | F01D 25/20 |
| | | | | 123/559.1 |
| 2014/0231174 | A1 | 8/2014 | Iwase et al. | |

FOREIGN PATENT DOCUMENTS

| DE | 102006040117 A1 | 3/2008 |
| DE | 112011102543 T5 | 5/2013 |
| DE | 112012000267 T5 | 9/2013 |
| DE | 112013000340 T5 | 8/2014 |
| DE | 102014201254 A1 | 8/2015 |

(Continued)

OTHER PUBLICATIONS

German Examination Report dated Oct. 16, 2017 in corresponding German Application No. 10 2017 203 541.2; 12 pages.

(Continued)

*Primary Examiner* — Colby M Hansen
(74) *Attorney, Agent, or Firm* — Maier & Maier, PLLC

(57) ABSTRACT

A drive device and a motor vehicle, having at least one drive machine and at least one gearbox. The drive device has at least one cooling system, which is designed to apply a cooling medium to the at least one drive machine and to the at least one gearbox, at least in regions. The disclosure further relates to a motor vehicle having a drive device.

16 Claims, 1 Drawing Sheet

(56) References Cited

FOREIGN PATENT DOCUMENTS

| | | |
|---|---|---|
| DE | 102014223339 A1 | 5/2016 |
| DE | 102014223340 A1 | 5/2016 |
| DE | 112015000919 T5 | 11/2016 |
| DE | 102015213109 A1 | 1/2017 |
| EP | 1750965 A1 | 2/2007 |
| WO | 2008/025691 A1 | 3/2008 |
| WO | 2013/018201 A1 | 2/2013 |
| WO | 2016/075334 A1 | 5/2016 |
| WO | 2016/075335 A1 | 5/2016 |
| WO | 2016/075336 A1 | 5/2016 |
| WO | 2016/075337 A1 | 5/2016 |

OTHER PUBLICATIONS

International Search Report and Written Opinion dated Apr. 10, 2018 in corresponding International Application No. PCT/EP2018/050846; 26 pages.

Office Action dated Aug. 28, 2020 in corresponding European Application No. 18 702 116.7; 10 pages including partial machine-generated English-language translation.

English translation of International Preliminary Report on Patentability dated Sep. 12, 2019 in corresponding International Application No. PCT/EP2018/050846; 8 pages.

* cited by examiner

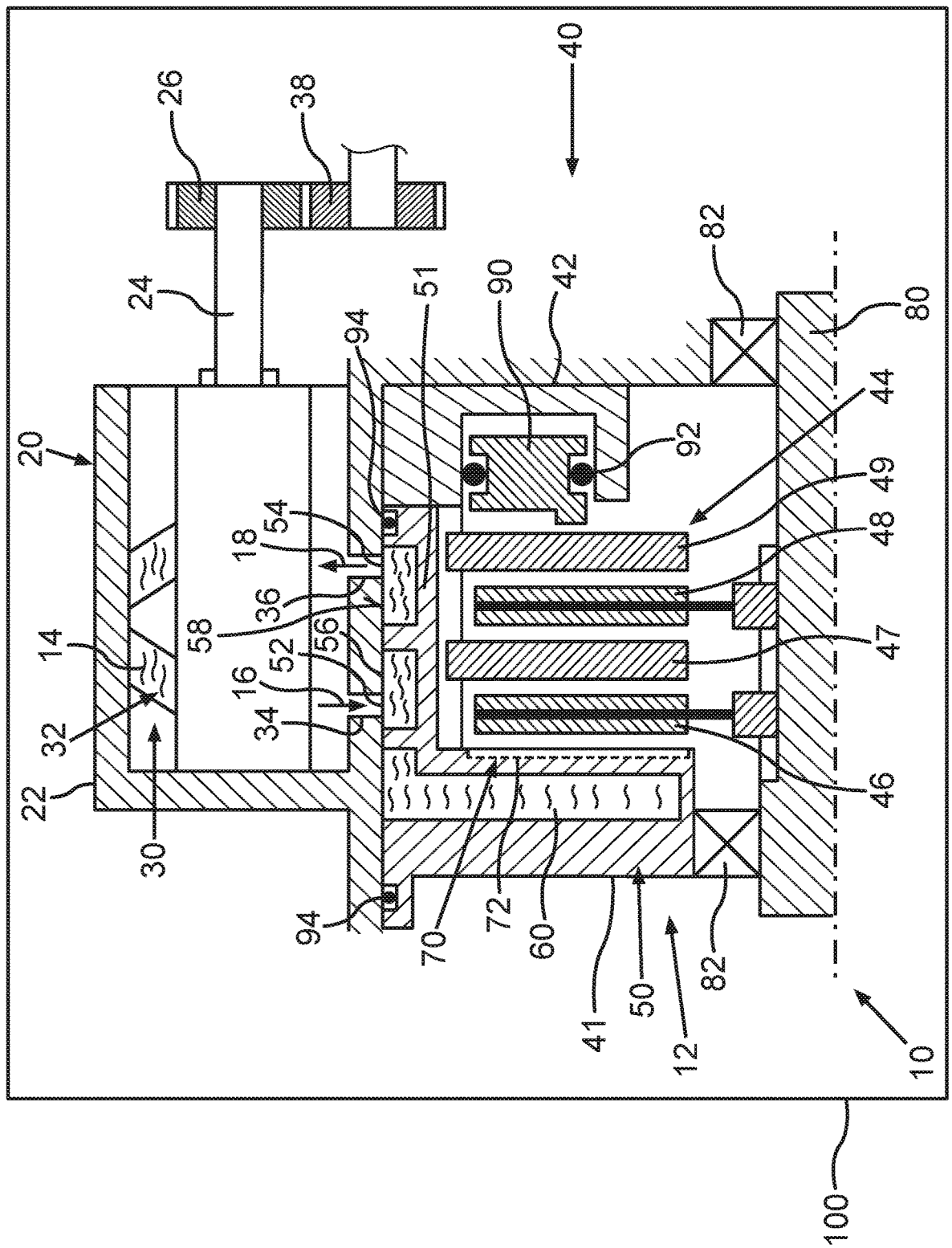

DRIVE DEVICE AND MOTOR VEHICLE HAVING A DRIVE DEVICE

FIELD

The invention relates to a drive device for a motor vehicle having at least one drive machine and at least one gearbox. The gearbox may be designed as an automatic transmission or a manual transmission. Another aspect of the invention relates to a motor vehicle having such a drive device.

BACKGROUND

DE 10 2015 213 109 A1 discloses a torque transmission device having a planetary transmission. The planetary transmission comprises planetary gears, a first internal gear, and/or a first sun gear as well as a second internal gear and/or a second sun gear. The first planetary gear meshes with the first internal gear and/or the first sun gear, and the second planetary gear meshes with the second internal gear and/or the second sun gear. Furthermore, the first and second planetary gears are arranged at a spacing from each other on a planetary shaft, and each of them is or can be rotationally connected thereto, wherein the planetary shaft is mounted such that the planetary gears are fixed in a position. The planetary transmission further comprises a double clutch device, which may be configured as a dry or wet double clutch device.

DE 10 2014 201 254 A1 discloses a transmission arrangement and a drive train for a hybrid vehicle and a respective hybrid vehicle. The transmission arrangement includes an electric machine which is connected to an input shaft, an internal combustion engine input shaft which can be connected to an internal combustion engine, an output shaft and a Ravigneaux planetary gear set; the planet carrier of which can be fastened to a transmission housing by means of a brake. The transmission arrangement is characterized by a shiftable clutch arrangement, by means of which the planet carrier and a second sun of the Ravigneaux planetary gear set and the internal combustion engine input shaft can be selectively coupled in a torque-transmitting manner. The transmission arrangement further comprises an auxiliary shaft, which passes longitudinally through the transmission arrangement as a coaxial central shaft. The auxiliary shaft is in interaction with the brake on the one hand and with the shiftable clutch arrangement on the other hand.

Such brakes are particularly thermally strained when braking transmission members, such as transmission shafts.

SUMMARY

It is the problem of the present invention to provide a drive device and a motor vehicle of the type mentioned at the outset, which can be cooled with a particularly small effort. This problem is solved by a drive device.

The invention is based on a drive device for a motor vehicle, having at least one drive machine and at least one gearbox. The drive machine may preferably be an electric machine. The gearbox is used for translating drive torque by means of which the motor vehicle can be driven. Various gear ratios can be therefore set by means of the gearbox. In other words, the gearbox is capable of shifting between various speeds.

According to the invention, the drive device has at least one cooling system, which is designed to apply a cooling medium to the at least one drive machine and to the at least one gearbox, at least in regions. The cooling system thus allows cooling of both the drive machine and the gearbox, whereby no separate cooling devices must be provided for the drive machine and the gearbox and cooling can be achieved with particularly little effort. The cooling system may for example comprise at least one heat exchanger for dissipating heat into the environment, multiple cooling ducts, which at least in regions extend through the drive machine and the gearbox, and at least one pump for conveying the cooling medium through the cooling ducts. The cooling ducts may for example be configured as annular ducts and extend across respective housing regions of the drive machine and the gearbox. It is a particular advantage that, since the gearbox is cooled, cooling transmission components by means of transmission fluid contained in the gearbox can at least in regions be eliminated, which helps reduce any splashing losses.

The term "apply," as used herein, means that the cooling medium moistens and thus wets or flows through the gearbox and the drive machine.

In an advantageous further development of the invention, the cooling system includes at least one gearbox cooling duct arrangement, which extends through a gear housing of the gearbox, at least in regions, and a machine cooling duct arrangement, which extends through a machine housing of the drive machine, at least in regions. This is advantageous since such coiling duct arrangements in the gear housing or machine housing, respectively, allow particularly requirement-based cooling. The gearbox cooling duct arrangement or machine cooling duct arrangement, respectively, may include respective cooling ducts, which can extend both in the axial direction of the gear housing or machine housing and in the peripheral direction of the gear housing or machine housing, respectively. This allows particularly uniform cooling, at least in regions, of the gearbox or drive machine, respectively.

The gear cooling duct arrangement and the machine cooling duct arrangement may be connected into a closed cooling circuit. To this end, the machine cooling duct arrangement may for example have overflow ducts via which the machine cooling duct arrangement can be in fluid communication with the gear cooling duct arrangement. This allows cooling of the gearbox and the drive machine with particularly little effort, since just one pump suffices to convey the cooling medium both through the gear cooling duct arrangement and the machine cooling duct arrangement. The pump can for example be integrated in the drive machine. The pump and the machine cooling duct arrangement allow independent cooling of the drive machine in that the cooling medium is moved relative to the machine housing, for example conveyed in the peripheral direction. Due to the communication between the machine cooling duct arrangement and the gear cooling duct arrangement, the cooling medium is conveyed both through the drive machine and through the gearbox when the pump is in operation in order to cool the gearbox in addition to the drive machine.

In another advantageous further development of the invention, the gear cooling duct arrangement has at least two cooling duct openings, by means of which the gear cooling duct arrangement is fluidically coupled to the machine cooling duct arrangement. This is an advantage, since the at least two cooling duct openings allow both media entry and thus an inflow and media exit and thus an outflow of the cooling medium from the machine cooling duct arrangement into the gear cooling duct arrangement, or from the gear cooling duct arrangement into the machine cooling duct arrangement, respectively.

In another advantageous further development of the invention, the gearbox comprises at least one shifting unit for setting at least one transmission ratio of the gearbox, wherein the at least one shifting unit can be and/or is coupled, at least in regions, in a contact heat conducting manner to the gear cooling duct arrangement. This is an advantage, since contact heat conduction prevents direct application of the cooling medium to the shifting unit and thus helps prevent splashing of the shifting unit in the cooling medium, for example. The shifting unit may in regions be in engagement with the gear housing, whereby the shifting unit is also coupled in regions in a contact heat conducting manner to the gear cooling duct arrangement. Heat transfer can then take place, for example, with the mediation of a cooling duct wall separating the gear cooling duct arrangement from the shifting unit. The cooling duct wall may be part of the gearbox. In addition, or alternatively, the shifting unit can also be couplable, at least in regions, in a contact heat conducting manner to the gear cooling duct arrangement. This is the case, for example, when the shifting unit is in contact with the gear housing in an activated state, while in a deactivated state there may be an air gap between the shifting unit and the gear housing. The shifting unit can be completely accommodated in an inner housing space defined by the gear housing with respect to an environment of the gearbox.

In another advantageous further development of the invention, the at least one shifting unit comprises at least one shifting member, which is at least in regions accommodated in a recess of the gear housing and coupled in a contact heat conducting manner to the gear cooling duct arrangement. This is an advantage, since arrangement in a recess allows particularly large-area contact between the shifting member and the gear housing and thus particularly efficient heat conduction between the shifting unit or its shifting member and the gear cooling duct arrangement. The shifting member may for example be configured as a disc which may be connected in a form-fitting manner to a gear shaft (internal disc) or gear housing (external disc).

In another advantageous further development of the invention, the at least one shifting unit is configured as a brake, particularly a dry brake. This is an advantage, since such a brake allows particularly undelayed shifting between various gear ratios. If the brake is configured as a dry brake, it can be operated without cooling by transmission fluid, which prevents any splashing losses. Dry brakes are also much less complex in design than so-called wet brakes, which are cooled by applying transmission fluid and can be operated at accordingly higher losses compared to dry brakes due to splashing effects. The cooling system allows an increase in service life of the dry brake, wherein for example friction pads of the dry brake are less subject to wear due to cooling by means of the cooling system. By cooling using the cooling system, the brake as a whole can have a particularly small and compact design, since the brake is under reduced thermal strain during operation as a result of cooling. If the brake is configured as a dry brake, there is no need for hydraulic measures aimed at oiling and cooling the brake, and the gearbox can make do with less transmission fluid altogether.

In another advantageous further development of the invention, the gearbox includes the drive machine. In other words, the drive machine can be a part of the gearbox. This is a particular advantage, since the motor vehicle can start from a standstill by means of the gearbox and drive machine, without having to resort to other drive motors, such as an internal combustion engine of the motor vehicle. The drive machine can be accommodated in an inner housing space of the gearbox and thus separated from an environment of the gearbox by the gear housing of the gearbox.

In another advantageous further development, the drive machine is coupled in a torque-transmitting manner to at least one transmission member of the gearbox. This is an advantage, since it provides further degrees of freedom for setting gear ratios of the gear box. The at least one transmission member can be different from a transmission input shaft and a transmission output shaft of the gearbox. The drive machine can have a drive shaft, which can be coupled to the at least one transmission member. To this end, a drive pinion connected to the drive shaft of the drive machine can for example be in engagement with the transmission member, which may for example be configured as a gear wheel.

In another advantageous further development of the invention, the drive machine is an electric machine. This is an advantage, since the electric machine can provide a particularly high drive torque even if the drive shaft of the electric machine is at a standstill. The drive machine can be operated as an electric motor and as a generator to allow energy recuperation.

Another aspect of the invention relates to a motor vehicle having a drive device according to the invention. In such a motor vehicle, cooling is possible with particularly little effort, since both the drive machine and the gearbox can be cooled using the cooling system. The features presented in conjunction with the drive device according to the invention and their advantages apply accordingly to the respective motor vehicle and vice versa.

The invention also includes further developments of the motor vehicle according to the invention, which have features already described in conjunction with further developments of the drive device according to the invention. For this reason, the respective further developments of the motor vehicle according to the invention are not described once again herein.

Exemplary embodiments of the invention will be described below. The only FIGURE shows a partial sectional view of a portion of a drive device which is arranged in a motor vehicle.

The exemplary embodiments explained below are preferred embodiments of the invention. In these exemplary embodiments, the components of the exemplary embodiment described each represent individual features of the invention which are to be considered independently, which features also separately develop the invention further and should therefore be considered a part of the invention, both by themselves and in another combination than the combination shown. Furthermore, the embodiments described can be supplemented by other features of the features of the invention already described.

Functionally identical elements are identified by the same reference symbols in the FIGURES.

BRIEF DESCRIPTION OF THE FIGURES

The FIGURE shows a schematic view of a motor vehicle 100 having a drive device 10. The FIGURE shows only a sectional view of a partial region of the drive device 10.

DETAILED DESCRIPTION

The drive device 10 comprises a drive machine 20 and a gearbox 40. The drive machine 20 is integrated in the gearbox 40. In other words, the gearbox 40 includes the drive machine 20. The drive machine 20 is herein coupled in a torque-transmitting manner to a transmission member 38 of the gearbox 40. The transmission member 38 may for example correspond to a gear wheel of the gearbox 40, as shown herein, and therefore be different from a transmission input shaft and a transmission output shaft (not shown herein) of the gearbox 40. The drive machine 20 is herein configured as an electric machine and allows starting and thus moving a motor vehicle 100 from its standstill, due to its torque-transmitting coupling to the transmission member 38. Other drive motors, such as an internal combustion engine of the motor vehicle 100 not shown in detail herein, can thus remain shut off (deactivated) during the starting process of the motor vehicle 100 by means of the drive machine 20. The drive machine 20 may include a drive shaft 24, as shown herein, which may be in engagement with the transmission member 38 via a drive pinion 26.

The drive device 10 has a cooling system 12, which is designed to apply a cooling medium 14 to the at least one drive machine 20 and to the at least one gearbox 40, at least in regions. The cooling medium 14 may be water or cooling water (water-glycol mixture), for example. The cooling system 12 may comprise a heat exchanger for cooling, which is not shown in detail herein and may also be called a heat transfer unit. To convey the cooling medium 14, the cooling system 12 may comprise a pump, which is also not shown in detail herein.

The cooling system 12 comprises a gear cooling duct arrangement 50, which extends through a gear housing 42 of the gearbox 40, at least in regions. Furthermore, the cooling system 12 comprises a machine cooling duct arrangement 30, which extends through a machine housing 22 of the drive machine 20, at least in regions. The machine cooling duct arrangement 30 may comprise at least one machine cooling duct 32, which may for example extend helically in the peripheral direction of the machine housing 22. The gear cooling duct arrangement 50 herein has two cooling duct openings 52, 54, by means of which the gear cooling duct arrangement 50 is fluidically coupled to the machine cooling duct arrangement 30. To this end, the machine cooling duct arrangement 30 comprises a first overflow duct 34 and a second overflow duct 36. The first overflow duct 34 is fluidically connected in the present exemplary embodiment to the first cooling duct opening 52, whereas the second overflow duct 36 is fluidically connected to the second cooling duct opening 54.

The first cooling duct opening 52 is configured as an inflow via which a media entry 16 of the cooling medium 14 can take place as illustrated by an arrow from the machine cooling duct arrangement 30 into the gear cooling duct arrangement 50. The second cooling duct opening 54 is configured herein as an outflow via which a media exit 18 of the cooling medium can take place as illustrated by an arrow from the gear cooling duct arrangement 50 into the machine cooling duct arrangement 30.

The machine housing 22 is connected to the gear housing 42 at a joint contact region. At least one media seal 94 which prevents an exit of the cooling medium 14 into the environment is provided at this contact region.

The gearbox 40 has at least one shifting unit 44 for setting at least one transmission ratio of the gearbox 40. The shifting unit 44 is herein configured as a dry brake and coupled in a contact heat conducting manner to a radial cooling duct 56 which is coupled with the first cooling duct openings 52 and to a radial cooling duct 58 which is fluidically coupled with the second cooling duct opening 54. The two radial cooling ducts 56, 58 conduct the cooling medium 14 at least in regions around the shifting unit 44, thereby cooling the shifting unit 44 in its radial extension by the cooling medium 14, particularly through heat transfer in the form of heat conduction. Heat is conducted herein via a duct cooling wall 51 in a (housing-fixed) outer support of the gear housing 42 which wall is engaged in a form-fitting manner by a central disc 47 and an outer disc 49 of the shifting unit 44. The gear cooling duct arrangement 50 also extends across a housing section 41 of the gear housing 42, in which an axial cooling duct 60 is provided for cooling the shifting unit 44 in the housing section 41. As can be seen in the sectional view, the axial cooling duct 60 has an L-shaped circumferential (rotational) cross section, is fluidically connected to at least one of the radial cooling ducts 56, 58 (not shown herein), and conducts the cooling medium 14 at least in regions in the axial extension of the shifting unit 44 at least in regions along the same at a spacing from an inner disc 46 of the shifting unit 44. The axial cooling duct 60 is preferably arranged circumferentially in the radial extension of the shifting unit 44 at the level of the first inner disc 46 and at least in regions in the housing section 41. This ensures particularly targeted cooling of friction pads (not identified in detail herein) of the shifting unit 44 arranged in its radial extension at the level of the first inner disc 46.

In addition to the first inner disc 46, the shifting unit 44 (brake) also includes a second inner disc 48. The inner discs 46, 48 are herein in engagement with a gear shaft 80 of the gearbox 40. The gear shaft 80 is mounted to the gear housing 42 via respective shaft bearings 82. A hydraulically movable actuating piston 90 with which the shifting unit 44 can be activated and deactivated is provided to support the gear shaft 80 with respect to the gear housing 42 and thereby to prevent rotation of the gear shaft 80 relative to the gear housing 42. The actuating piston 90 is accommodated in a sealing manner in the gear housing 42 by means of a piston packing 92.

In the activated state, the actuating piston 90 applies a pressing force to the discs 46, 47, 48, 49, whereby frictional engagement occurs at the respective friction pads between the central disc 47, the outer disc 49, and the inner discs 46, 48, and the gear shaft 80 is held and thus supported at the gear housing 42. The pressing force presses the inner disc 46, which can also be called a shifting member of the shifting unit 44, to the housing section 41, whereby contact heat is conducted between the axial cooling duct 60 and the inner disc 46. Contact heat is conducted via a wall 72 of the housing section 41. The wall 72 separates the axial cooling duct 60 from the inner disc 46 (shifting member). When the shifting unit 44 is in its deactivated state, in which the actuating piston 90 does not apply a pressing force to the discs 46, 47, 48, 49, contact heat conduction between the gear cooling duct arrangement 50 or its axial cooling duct 60 and the inner disc 46 may be prevented. A recess 70 in which the inner disc 46 (shifting member) can be accommodated and thereby coupled in a contact heat conducting manner to the axial cooling duct 60 of the gear cooling duct arrangement 50 may be provided in the housing section 41. The recess 70 allows particularly efficient cooling of the inner disc 46. This is made possible in that the recess 70 encloses regions of the inner disc 46, when the actuating piston 90 (when activating the shifting unit 44) presses the discs 46, 47, 48, 49 against each other and thereby presses the inner disc 46 into the recess 70 and against the wall 72.

Overall, the examples show how the present invention facilitates effective cooling even for dry brakes of the gearbox 40, which may for example be configured as an automatic transmission. The capacity of the dry, housing-fixed shifting members (discs 47, 49) can be optimized by active cooling using the cooling system 12. This allows particularly effective use of the available potentials of the gearbox 40, which may include the drive machine 20. Cooling by means of the cooling system 12 opens up additional installation space in the gearbox 40 by implementing compact designs of the shifting members (discs 46, 47, 48, 49). Since the discs (47, 49) fastened to the gear housing 42 are actively cooled, the load (torque capacity) of the entire shifting unit 44 can be considerably increased, since an operating temperature that arises from relative movement between the discs 46, 47, 48, 49 as a result of the pressing force and can be tolerated by the materials of the respective discs 46, 47, 48, 49 can be reduced. This operating temperature, which occurs when the individual discs 46, 47, 48, 49 are connected in a form-fitting manner, is a critical design variable of the shifting unit 44. By effectively reducing the operating temperature using the cooling system 12, dimensioning of the shifting unit 44 can be positively affected in that the shifting unit 44 can be of a particularly compact design. For example, the friction pads can be dimensioned smaller than would be feasible without cooling by the cooling system 12.

Furthermore, active cooling by means of the cooling system 12 reduces thermal radiation from the shifting unit 44 to adjacent transmission components.

The shifting unit 44 may be designed as a multi-disc dry brake or as a single-disc dry brake, as shown herein.

While automatic transmissions known from prior art mostly use wet multi-plate clutches and wet brakes to allow a non-positive connection of transmission components, the present invention allows the use of dry shifting units for shifting the respective gears of the gearbox 40, that is, for setting various transmission ratios. In clutches, the individual clutch elements typically rotate with gear shafts connected to said clutches, whereas in brakes the individual brake elements are housing-fixed. In transmissions known from prior art, the clutches or brakes are bathed in oil, which is absolutely required for their functioning and for cooling the friction pads of wet clutches and wet brakes.

The invention generally allows the use of dry brakes in the gearbox 40, since the operating temperature of the dry brake (shifting unit 44) can be effectively reduced by means of the cooling system 12. The cooling system 12 allows cooling of respective friction contact sites in the region of the friction pads between the individual discs 46, 47, 48, 49 or the components of the shifting unit 44 involved in generating the operating temperature by means of the cooling medium 14.

The gearbox 40 can be designed as an electrified transmission in that the drive machine 20 is configured as an electrical machine and integrated into the gearbox 40. The machine cooling duct arrangement 30 may be arranged in a housing-fixed stator of the electrical machine (drive machine 20), wherein the machine cooling duct arrangement 30 may comprise annular ducts through which water flows in an outer region of a stator receptacle or a cooling shell of the drive machine 20. The cooling medium 14 may be water or a water-glycol mixture, to name just a few examples.

The present invention allows joint cooling of the drive machine 20 and at least the discs 47, 49 of the shifting unit 44, which are in engagement with the gear housing 42. The machine cooling duct arrangement 30 and the gear cooling duct arrangement 50 may generally comprise similar annular ducts for conducting the cooling medium 14, which ducts may be embedded in the gear housing 42 or the machine housing 22, respectively.

The invention claimed is:

1. A drive device for a motor vehicle, comprising:
   at least one drive machine arranged in a machine housing and at least one gearbox arranged in a gear housing, and
   at least one cooling system, which is designed to apply a cooling medium to the at least one drive machine and to the at least one gearbox,
   wherein the machine housing includes at least one machine cooling duct arrangement extending through the machine housing, and the gear housing includes at least one gear cooling duct arrangement extending through the gear housing, and
   wherein the gearbox comprises at least one shifting unit configured as a dry brake, the at least one shifting unit provided to set at least one transmission ratio of the gearbox.

2. The drive device according to claim 1, wherein the machine housing is connected to the gear housing with a sealing media provided therebetween, and
   wherein the at least one machine cooling duct arrangement forms a closed cooling circuit with the at least one gear cooling duct arrangement.

3. The drive device according to claim 2, wherein the gear cooling duct arrangement has at least two cooling duct openings, by means of which the gear cooling duct arrangement is fluidically coupled to the machine cooling duct arrangement.

4. The drive device according to claim 3, wherein, in an activated state of the shifting unit, a shifting member of the at least one shifting unit is pressed against a first wall of the at least one gear cooling duct arrangement, and
   wherein, in a deactivated state of the shifting unit, an airgap exists between the shifting member and the first wall.

5. The drive device according to claim 3, wherein the at least one machine cooling duct arrangement extends helically about a periphery of the machine housing.

6. The drive device according to claim 2, wherein the at least one machine cooling duct arrangement extends helically about a periphery of the machine housing.

7. The drive device according to claim 1, wherein, in an activated state of the shifting unit, a shifting member of the at least one shifting unit is pressed against a first wall of the at least one gear cooling duct arrangement, and
   wherein, in a deactivated state of the shifting unit, an airgap exists between the shifting member and the first wall.

8. The drive device according to claim 7, wherein the shifting member is at least partially accommodated in a recess of the first wall.

9. The drive device according to claim 7, wherein a second wall of the at least one gear cooling duct arrangement supports at least one outer disc of the shifting arrangement.

10. The drive device according to claim 7, wherein the at least one machine cooling duct arrangement extends helically about a periphery of the machine housing.

11. A motor vehicle comprising the drive device according to claim 7.

12. The drive device according to claim 1, wherein the at least one machine cooling duct arrangement extends helically about a periphery of the machine housing.

13. The drive device according to claim 1, wherein the drive machine is coupled in a torque-transmitting manner to a transmission member of the gearbox.

14. The drive device according to claim 1, wherein the drive machine is an electrical machine.

15. The drive device according to claim 2, wherein, in an activated state of the shifting unit, a shifting member of the at least one shifting unit is pressed against a first wall of the at least one gear cooling duct arrangement, and wherein, in a deactivated state of the shifting unit, an airgap exists between the shifting member and the first wall.

16. A motor vehicle comprising the drive device according to claim 1.

* * * * *